US011739025B2

(12) United States Patent
Lee

(10) Patent No.: US 11,739,025 B2
(45) Date of Patent: Aug. 29, 2023

(54) MILK OF LIME PREPARATION APPARATUS COMPRISING WASTE HEAT RECOVERY LINE, AND MILK OF LIME PREPARATION METHOD USING WASTE HEAT RECOVERY LINE

(71) Applicant: Ji Heon Lee, Changwon-si (KR)

(72) Inventor: Ji Heon Lee, Changwon-si (KR)

( * ) Notice: Subject to any disclaimer, the term of this patent is extended or adjusted under 35 U.S.C. 154(b) by 591 days.

(21) Appl. No.: 16/644,407

(22) PCT Filed: Aug. 31, 2018

(86) PCT No.: PCT/KR2018/010141
§ 371 (c)(1),
(2) Date: Mar. 4, 2020

(87) PCT Pub. No.: WO2019/050221
PCT Pub. Date: Mar. 14, 2019

(65) Prior Publication Data
US 2021/0070655 A1 Mar. 11, 2021

(30) Foreign Application Priority Data

Sep. 5, 2017 (KR) .................. 10-2017-0113147
Sep. 5, 2017 (KR) .................. 10-2017-0113150

(51) Int. Cl.
*C04B 2/04* (2006.01)
*B01F 23/53* (2022.01)
(Continued)

(52) U.S. Cl.
CPC ................ *C04B 2/04* (2013.01); *B01F 23/53* (2022.01); *B01F 27/80* (2022.01); *B01F 33/811* (2022.01);
(Continued)

(58) Field of Classification Search
CPC .. C04B 2/04; B02F 23/53; B01F 35/93; B01F 23/53
(Continued)

(56) References Cited

U.S. PATENT DOCUMENTS 7,451,611 B2 * 11/2008 Muscatell ............. F24F 5/0046
62/235.1

FOREIGN PATENT DOCUMENTS

CN 201495126 U 6/2010
CN 203116559 U 8/2013
(Continued)

OTHER PUBLICATIONS

International Search Report in International Application No. PCT/KR2018/010141, filed Aug. 31, 2018.
(Continued)

*Primary Examiner* — Marc C Howell
(74) *Attorney, Agent, or Firm* — SALIWANCHIK, LLOYD & EISENSCHENK

(57) ABSTRACT

The present disclosure relates to a milk-of-lime preparation apparatus and preparation method having waste heat recovery line, that may recover waste heat generated during preparation of liquid milk-of-lime and deliver the recovered waste heat to water, so as to supply the water at an optimal temperature necessary for a hydration reaction, thereby increasing the reaction efficiency and reducing the preparation time of the milk-of-lime. Especially, the milk-of-lime preparation apparatus consists of a water tank that receives room temperature water from a water supply pipe and stores the received water inside the water tank; a raw material input pipe that transfers calcine lime powder from one end to the other end through pressure supply from a BCT vehicle that carries the calcine lime powder; a water input pipe of which one end is connected with the water tank, and that receives
(Continued)

the water stored inside the water tank and transfers the received water to the other end; a milk-of-lime tank that receives the water from the other end of the water input pipe, that receives the calcine lime powder from the other end of the raw material input pipe, and that stirs the received calcine lime powder and the water by means of a stirrer installed inside the milk-of-lime tank, to prepare and store milk-of-lime; a discharge pipe that is installed at one side of the milk-of-lime tank to discharge the milk-of-lime stored inside the milk-of-lime tank; and a waste heat recovery line that circulates the water such that the water stored inside the water tank exchanges heat with the milk-of-lime stored inside the milk-of-lime tank and then is stored back inside the water tank.

15 Claims, 13 Drawing Sheets

(51) Int. Cl.
*B01F 27/80* (2022.01)
*B01F 33/81* (2022.01)
*B01F 35/93* (2022.01)
*B01F 35/21* (2022.01)
*B01F 35/221* (2022.01)
*B01F 23/50* (2022.01)

(52) U.S. Cl.
CPC ...... *B01F 35/2117* (2022.01); *B01F 35/2215* (2022.01); *B01F 35/93* (2022.01); *B01F 23/56* (2022.01)

(58) Field of Classification Search
USPC .......................................................... 423/640
See application file for complete search history.

(56) References Cited

FOREIGN PATENT DOCUMENTS

| | | |
|---|---|---|
| JP | 2012-239956 A | 12/2012 |
| KR | 2002-0046332 A | 6/2002 |
| KR | 10-0758248 B1 | 9/2007 |
| KR | 10-1084690 B1 | 11/2011 |
| KR | 10-1194899 B1 | 10/2012 |
| KR | 10-1832104 B1 | 2/2018 |
| KR | 10-1832105 B1 | 2/2018 |

OTHER PUBLICATIONS

Office Action dated Jul. 16, 2021 in Chinese Application No. 201880066205.6.

* cited by examiner

US 11,739,025 B2

MILK OF LIME PREPARATION APPARATUS COMPRISING WASTE HEAT RECOVERY LINE, AND MILK OF LIME PREPARATION METHOD USING WASTE HEAT RECOVERY LINE

CROSS-REFERENCE TO RELATED APPLICATIONS

This application is the U.S. national stage application of International Patent Application No. PCT/KR2018/010141, filed Aug. 31, 2018, which claims the benefit under 35 U.S.C. § 119 of Korean Application Nos. 10-2017-0113147, filed Sep. 5, 2017; and 10-2017-0113150, filed Sep. 5, 2017, the disclosures of each of which are incorporated herein by reference in their entirety.

FIELD

The present invention relates to a milk-of-lime preparation apparatus for mixing calcine lime powder and water to prepare liquid milk-of-lime, and a milk-of-lime preparation method using the same, and more particularly, to a milk-of-lime preparation apparatus having waste heat recovery line, where waste heat being generated when preparing the liquid milk-of-lime is recovered and delivered to the water, so that the water is supplied at a temperature that is optimal for hydration reaction, thereby increasing the reaction efficiency and reducing the preparation time of the milk-of-lime, and a preparation method using the same.

BACKGROUND

Acid wastewater discharged from industrial sources and exhaust gas from flammable incinerators contain acidic chemicals such as hydrogen chloride (HCL) and sulfur oxides (Sox), etc. The usual treatment process for such acidic chemicals is neutralization using alkali neutralizers. These alkali neutralizers include milk-of-lime ($Ca(OH)_2$), limestone ($CaCO_3$), calcine lime (CaO), dolomatic limestone ($CaMg(CO_3)_2$) and soda lime (NaOH), but the most widely used alkali neutralizer is milk-of-lime due to its excellent chemical reactivity and cost competitiveness.

The general preparation method for milk-of-lime is as illustrated in FIG. 1. Calcine lime powder, which is raw material, is carried by a Bulk Cement Trailer (BCT) vehicle 1. The calcine lime powder is taken out from the BCT vehicle 1 and is stored in a silo 2. After supplying water to a product preparation tank 3, an appropriate amount of calcine lime powder is taken out from the silo 2 and is put into the product preparation tank 3. The water ($H_2O$) and the calcine lime powder (CaO) inside the product preparation tank 3 are then stirred by means of a stirrer 4, so that through hydration reaction of the water ($H_2O$) and the calcine lime (CaO), milk-of-lime ($Ca(OH)_2$) is prepared. The milk-of-lime prepared in the product preparation tank 3 is transferred to a storage tank 5 for product release and then is stored there. When released, the milk-of-lime is transferred to a usage tank 7 of a consumer through a tank lorry of a transportation vehicle 6.

The conventional milk-of-lime preparation method as described above has several problems. First, it causes environmental pollution due to the arsenic acid of the calcine lime powder generated when transferring the calcine lime powder from the BCT vehicle 1 to the silo 2 and the need to install a dust collector. Second, since the producers and consumers are separated from each other, there is significant loss from the increase in facility investment costs in the production sites and the increase in cost of logistics to the consumers.

In order to resolve these problems, Korean Patent No. 10-1084690 'MILK-OF-LIME PREPARATION DEVICE' was proposed as illustrated in FIG. 2, which consists of a raw material input pipe 10 for receiving calcine lime powder from a BCT vehicle 11; a supply pipe 20 that is formed to join with the other end of the raw material input pipe 10 such that it is in fluid communication with the other end of the raw material input pipe 10, and that receives water from one end and mixes the water with the calcine lime powder transferred from the raw material input pipe 10, and that supplies the mixed calcine lime powder and water to the other end; a milk-of-lime tank 30 that receives the calcine lime powder and the water from the supply pipe 20 and that stirs the received calcine lime powder and the water by means of a stirrer 31 installed inside the milk-of-lime tank 30, thereby preparing and storing milk-of-lime; and a discharge pipe 40 installed at one side of the milk-of-lime tank 30 to discharge the stored milk-of-lime.

Accordingly, by providing an equipment that can prepare, produce and use milk-of-lime with only the milk-of-lime tank 30 such that consumers can prepare the milk-of-lime themselves, it became possible to significantly reduce the logistics cost that occurs when delivering liquid milk-of-lime, and inhibit dust from being generated when preparing the milk-of-lime.

However, even when using the prior art milk-of-lime preparation device described above, when calcine lime powder and water undergo a hydration reaction inside the milk-of-lime tank 30 to prepare milk-of-lime, an exothermic reaction rising up to approximately 90 to 100° C. occurs, and in order to use several tons or several dozen tons of prepared milk-of-lime of which the temperature has increased to 90 to 100° C., there occurs a problem that it takes a long time until the final use of the milk-of-lime since it must be left for one or two days at room temperature for natural cooling so that it reaches room temperature (20±5° C.).

Meanwhile, the water supplied through the supply pipe 20 is supplied at a low temperature or room temperature, and if warm water of 40 to 50° C. is to be used for the hydration reaction with the calcine lime powder, the reaction rate and efficiency of the hydration reaction would increase.

The principle of resolving the task of the present disclosure is to solve the aforementioned problem and to maximize the advantages of using warm water during the hydration reaction, and also if the waste heat generated by the hydration reaction during preparation of milk-of-lime can be used in raising the temperature of the water to be supplied, it will be possible to supply the water at an optimal temperature necessary for the hydration reaction, thereby increasing the reaction efficiency and reducing the preparation time of the milk-of-lime.

SUMMARY

The purpose of the present disclosure is to provide a milk-of-lime preparation apparatus and preparation method having waste heat recovery line, that may recover waste heat generated during preparation of liquid milk-of-lime and deliver the recovered waste heat to water, so that the water can be supplied at an optimal temperature necessary for a hydration reaction, thereby increasing the reaction efficiency and reducing the preparation time of the milk-of-lime.

Other purposes, certain advantages and new characteristics of the present disclosure shall become more apparent from the detailed description and desirable embodiments hereinafter with reference to the drawings attached.

Therefore, a milk-of-lime preparation apparatus having waste heat recovery line according to the present disclosure for achieving the aforementioned purposes consists of a water tank that receives room temperature water from a water supply pipe and stores the received water inside the water tank; a raw material input pipe that transfers calcine lime powder from one end to the other end through pressure supply from a BCT vehicle that carries the calcine lime powder; a water input pipe of which one end is connected with the water tank, and that receives the water stored inside the water tank and transfers the received water to the other end; a milk-of-lime tank that receives the water from the other end of the water input pipe, that receives the calcine lime powder from the other end of the raw material input pipe, and that stirs the received calcine lime powder and the water by means of a stirrer installed inside the milk-of-lime tank, to prepare and store milk-of-lime; a discharge pipe that is installed at one side of the milk-of-lime tank to discharge the milk-of-lime stored inside the milk-of-lime tank; and a waste heat recovery line that circulates the water such that the water stored inside the water tank exchanges heat with the milk-of-lime stored inside the milk-of-lime tank and then is stored back inside the water tank.

Further, the waste heat recovery line may include a transfer pipe of which one end is connected with a lower portion of the water tank, and that transfers the water stored inside the water tank to the other end; a heat exchange pipe of which one end is connected with the transfer pipe and of which the other end passes through the inside of the milk-of-lime tank; and a recovery pipe of which one end is connected with the other end of the heat exchange pipe, and of which the other end is connected with an upper portion of the water tank.

Further, the milk-of-lime preparation apparatus having waste heat recovery line may further include a milk-of-lime temperature sensor that senses a temperature of the milk-of-lime stored inside the milk-of-lime tank; a water temperature sensor that senses a temperature of the water stored inside the water tank; and a controller that receives a temperature value sensed from each of the milk-of-lime temperature sensor and the water temperature sensor, and operates the waste heat recovery line.

Further, if the temperature value received from the milk-of-lime temperature sensor is 40° C. or above, the controller may be configured to operate the waste heat recovery line such that the temperature value received from the water temperature sensor has a range of 40 to 50° C.

Further, the milk-of-lime preparation apparatus having waste heat recovery line may further include a meter that is installed in the milk-of-lime tank to measure a supply amount of the calcine lime powder being supplied from the raw material input pipe and a supply amount of the water being supplied from the water input pipe.

Further, the milk-of-lime tank may further comprise a vapor discharge hole that is installed on an upper portion such that vapor generated by a hydration reaction of the calcine lime powder and the water can be discharged outside; and the milk-of-lime preparation apparatus may further comprise: a spray pipe of which one end is bifurcated from the water input pipe to receive the water from the water input pipe and of which the other end is located inside the vapor discharge hole to discharge the water; and a spray nozzle that is installed at the other end of the spray pipe to spray the water being discharged from the spray pipe such that the vapor being discharged through the vapor discharge hole is condensed.

Further, at least one or more of the milk-of-lime tank, the water tank, the water input pipe and the waste heat recovery line may be thermally insulated, or installed underground.

Further, a milk-of-lime preparation method using waste heat recovery line according to the present disclosure for achieving the aforementioned purposes consists of a water-storing step of receiving room temperature water from a water supply pipe and storing the received water inside a water tank; a water-inputting step of transferring the water stored inside the water tank from one end of a water input pipe connected to the water tank to the other end of the water input pipe; a raw-material inputting step of transferring calcine lime powder from one end of a raw material input pipe to the other end of the raw material input pipe through pressure supply from a BCT vehicle that carries the calcine lime powder; a milk-of-lime preparing step comprising: receiving the water from the other end of the water input pipe to the inside of a milk-of-lime tank; receiving the calcine lime powder from the other end of the raw material input pipe; and stirring the received calcine lime powder and the water through a stirrer installed inside the milk-of-lime tank, to prepare and store milk-of-lime; a waste heat recovering step of circulating the water stored inside the water tank such that the water exchanges heat with the milk-of-lime stored inside the milk-of-lime tank and then is stored back inside the water tank; and a milk-of-lime discharging step of discharging the milk-of-lime prepared and stored inside the milk-of-lime tank, through a discharge pipe installed at one side of the milk-of-lime tank.

Further, the waste heat recovering step may comprise: a step of transferring the water stored inside the water tank through a transfer pipe of which one end is connected with a lower portion of the water tank to the other end of the transfer pipe; a step of heat-exchanging the milk-of-lime stored inside the milk-of-lime tank with the water transferred through the transfer pipe, by means of a heat exchange pipe of which one end is connected with the other end of the transfer pipe and of which the other end passes through the inside of the milk-of-lime tank; and a step of recovering the water that has undergone heat exchange into the inside of the water tank, by means of a recovery pipe of which one end is connected with the other end of the heat exchange pipe and of which the other end is connected with an upper portion of the water tank.

Further, the waste heat recovering step may further comprise: a step of sensing a temperature of the milk-of-lime stored inside the milk-of-lime tank by means of a milk-of-lime temperature sensor; a step of sensing a temperature of the water stored inside the water tank by means of a water temperature sensor; and a step of controlling recovery of waste heat, comprising: receiving a temperature value sensed from each of the milk-of-lime temperature sensor and the water temperature sensor; and then controlling an operation of the step of ransferring the water.

Further, at the step of controlling recovery of waste heat, the operation of the step of transferring the water may be controlled such that if the temperature value received from the milk-of-lime temperature sensor is 40° C. or above, the temperature value received from the water temperature sensor has a range of 40 to 50° C.

Further, the milk-of-lime preparation method using waste heat recovery line may further include measuring of milk-of-lime comprising: measuring a supply amount of the calcine lime powder being supplied from the raw material input pipe and a supply amount of the water being supplied from the water input pipe through a meter installed in the milk-of-lime tank.

The milk-of-lime preparation apparatus and preparation method having waste heat recovery line according to the present disclosure may recover the waste heat generated during preparation of liquid milk-of-lime through the waste heat recovery line and may deliver the recovered waste heat to water, and thereby resulting in an effect of supplying the water at an optimal temperature necessary for a hydration reaction, to increase the reaction efficiency and reduce the preparation time of the milk-of-lime.

DETAILED DESCRIPTION

Figure 1:
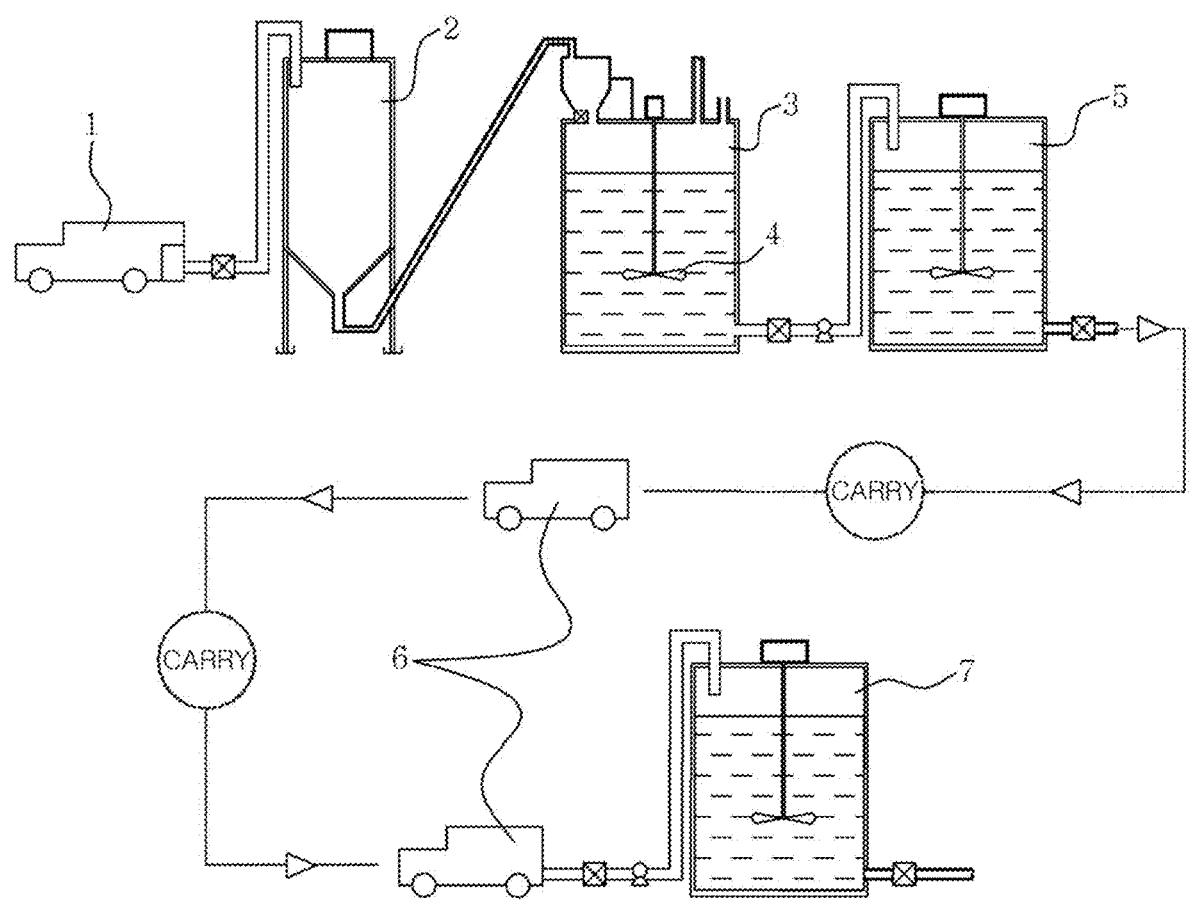
FIG. 1 is a configuration diagram illustrating an embodiment of a milk-of-lime preparation apparatus according to prior art.
Figure 2:
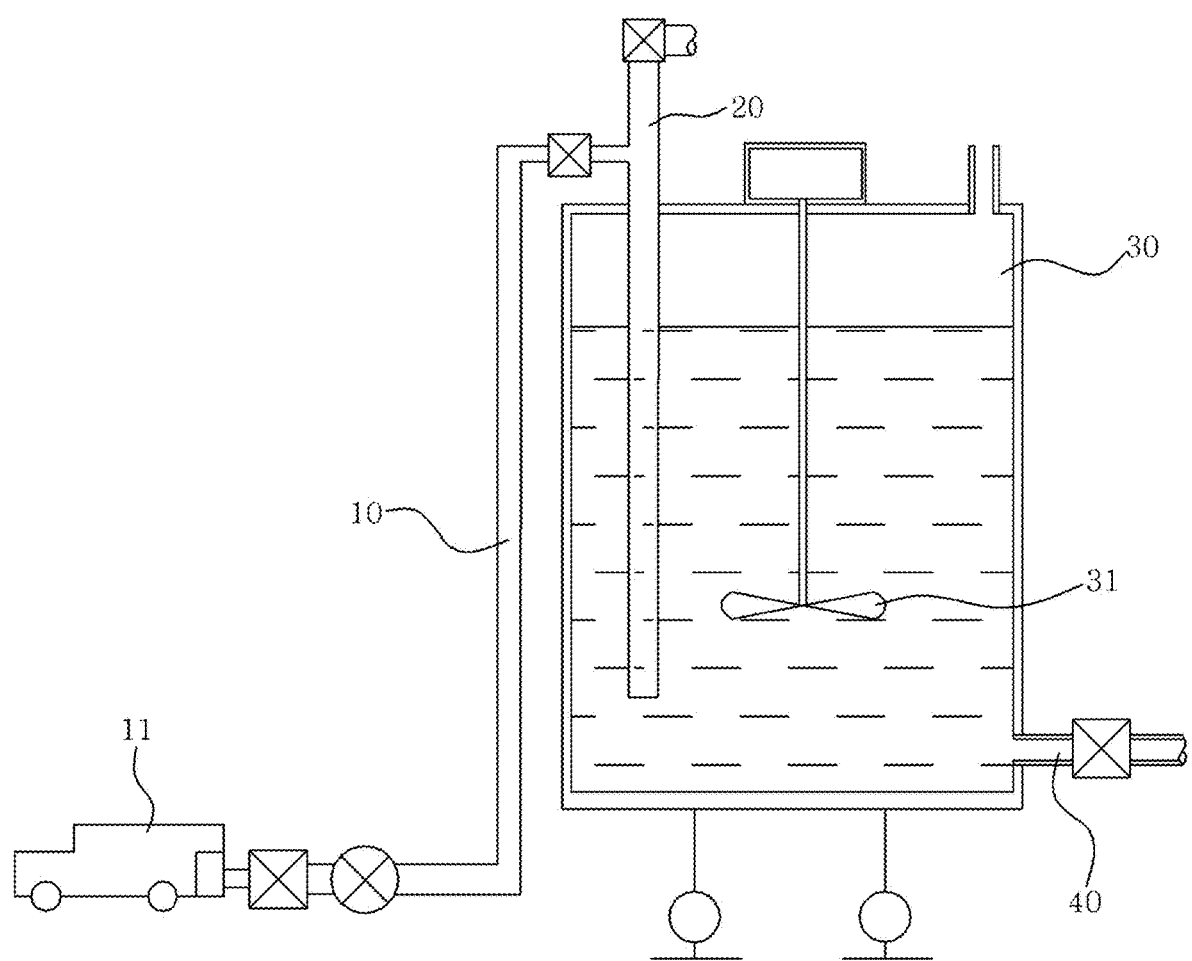
FIG. 2 is a configuration diagram illustrating another embodiment of the milk-of-lime preparation apparatus according to prior art.

Hereinbelow, desirable embodiments of a milk-of-lime preparation apparatus having waste heat recovery line according to the present disclosure will be described in detail with reference to the drawings attached.

As illustrated in FIGS. 4, 6 to 10, 12 and 13, the milk-of-lime preparation apparatus having waste heat recovery line according to the present disclosure may include a water tank 100, a raw material input pipe 200, a water input pipe 300, a milk-of-lime tank 400, a discharge pipe 500 and a waste heat recovery line 600. Further, the waste heat recovery line 600 may include a transfer pipe 610, a heat exchange pipe 620 and a recovery pipe 630, and may further include a milk-of-lime temperature sensor 700, a water temperature sensor 800 and a controller 900.

Figure 4:
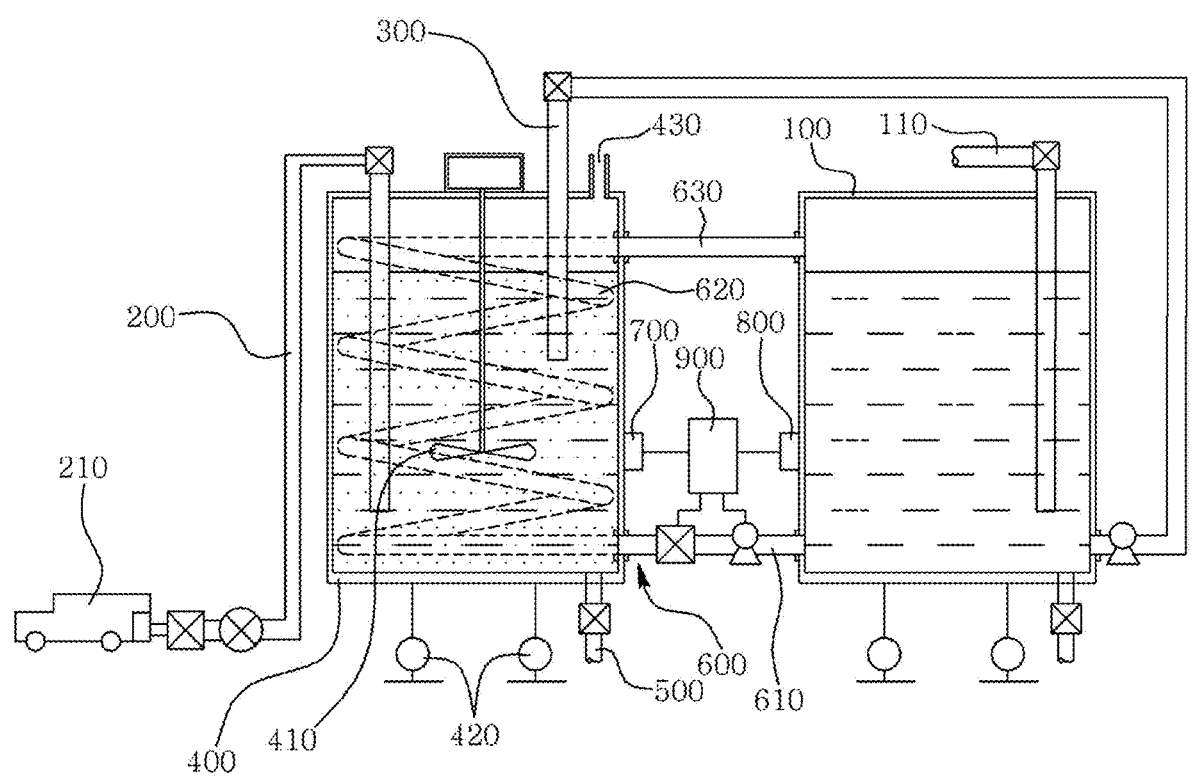
FIG. 4 is a configuration diagram illustrating an embodiment of a milk-of-lime preparation apparatus having waste heat recovery line according to the present disclosure.
Figure 6:
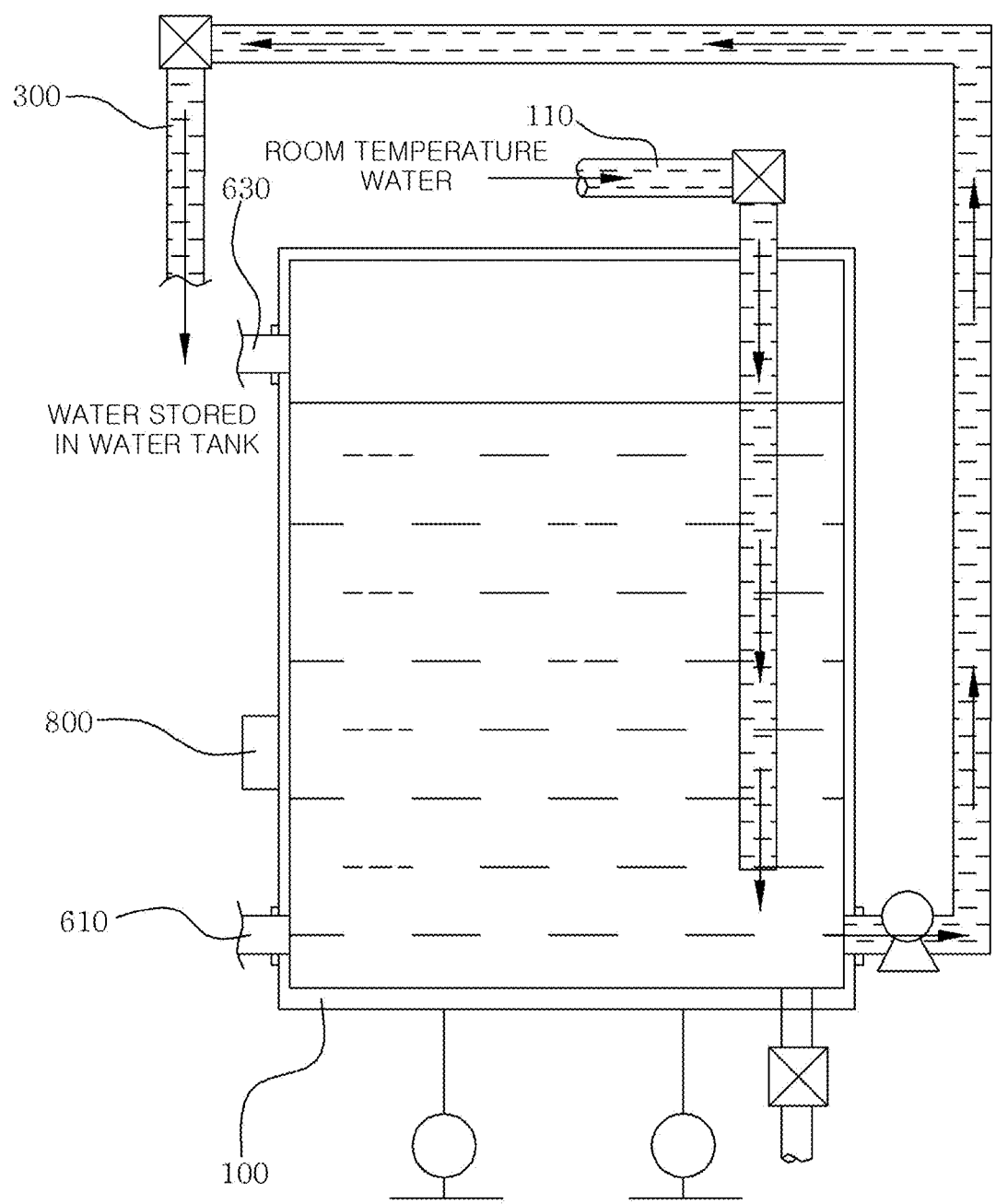
FIG. 6 is a main configuration diagram illustrating a water tank and a water input pipe of the embodiment of FIG. 3.

As illustrated in FIGS. 4 and 6, the water tank 100 receives room temperature water from a water supply pipe 110, and stores the water inside the water tank 100. The water being supplied from the water supply pipe 110 is industrial use water or engineering use water. It may be tap water or underground water from the area, and it may be at room temperature in summer seasons and low temperature in winter seasons. The water tank 100 receives the room temperature water through the water supply pipe 110, and then stores the water inside the water tank 100. Then, the water tank 100 supplies the stored water through one end of the water input pipe 300 that will be described hereinafter toward the other end of the water input pipe 300. Here, the water stored inside the water tank 100 may be water of which the temperature has increased due to heat exchange through the waste heat recovery line 600 that will be described hereinafter.

Figure 7:
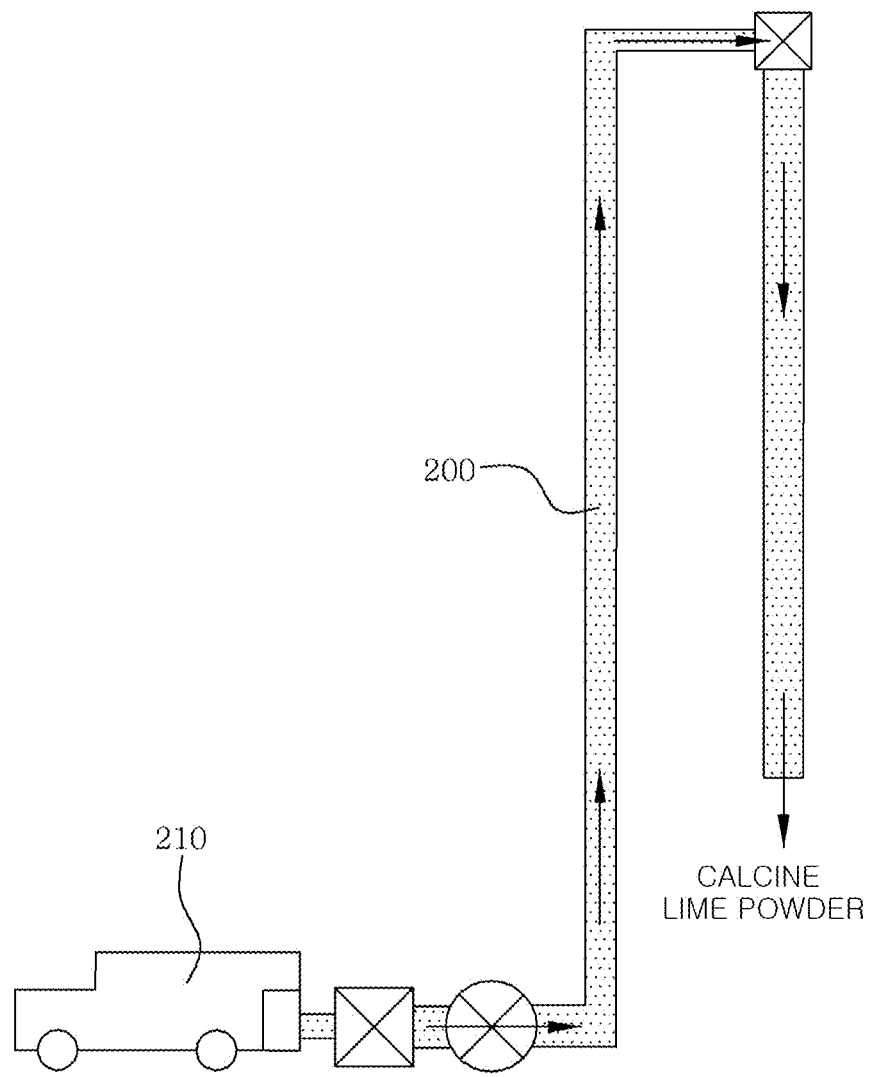
FIG. 7 is a main configuration diagram illustrating an operation process of a raw material input pipe of the embodiment of FIG. 4.

As illustrated in FIGS. 4 and 7, the raw material input pipe 200 transfers calcine lime powder from one end to the other end through pressure supply from a BCT vehicle 210 that carries the calcine lime powder. Here, the BCT vehicle 210 is a Bulk Cement Trailer, which is a truck that carries raw material in powder form. Specifically, the BCT vehicle 210 loads the calcine lime powder, which is a raw material in powder form, on the tank, and carries the calcine lime powder to a consumer, and then blows out the calcine lime powder inside the tank with the compressed air being generated from a compressor mounted on the vehicle. The calcine lime powder being supplied from the BCT vehicle 210 will move from one end to the other end of the raw material input pipe 200. That is, one end of the raw material input pipe 200 is connected with the BCT vehicle 210, and the other end is connected up until the inside of the milk-of-lime tank 200 that will be described hereinafter.

As illustrated in FIGS. 4 and 6, with one end connected with the water tank 100, the water input pipe 300 receives the water stored inside the water tank 100, and transfers the received water to the other end. That is, from one end of the water input pipe 300, the water stored inside the water tank 100 is supplied, and through the other end, the water is transferred to the inside of the milk-of-lime tank 300 that will be described hereinafter.

Figure 8:
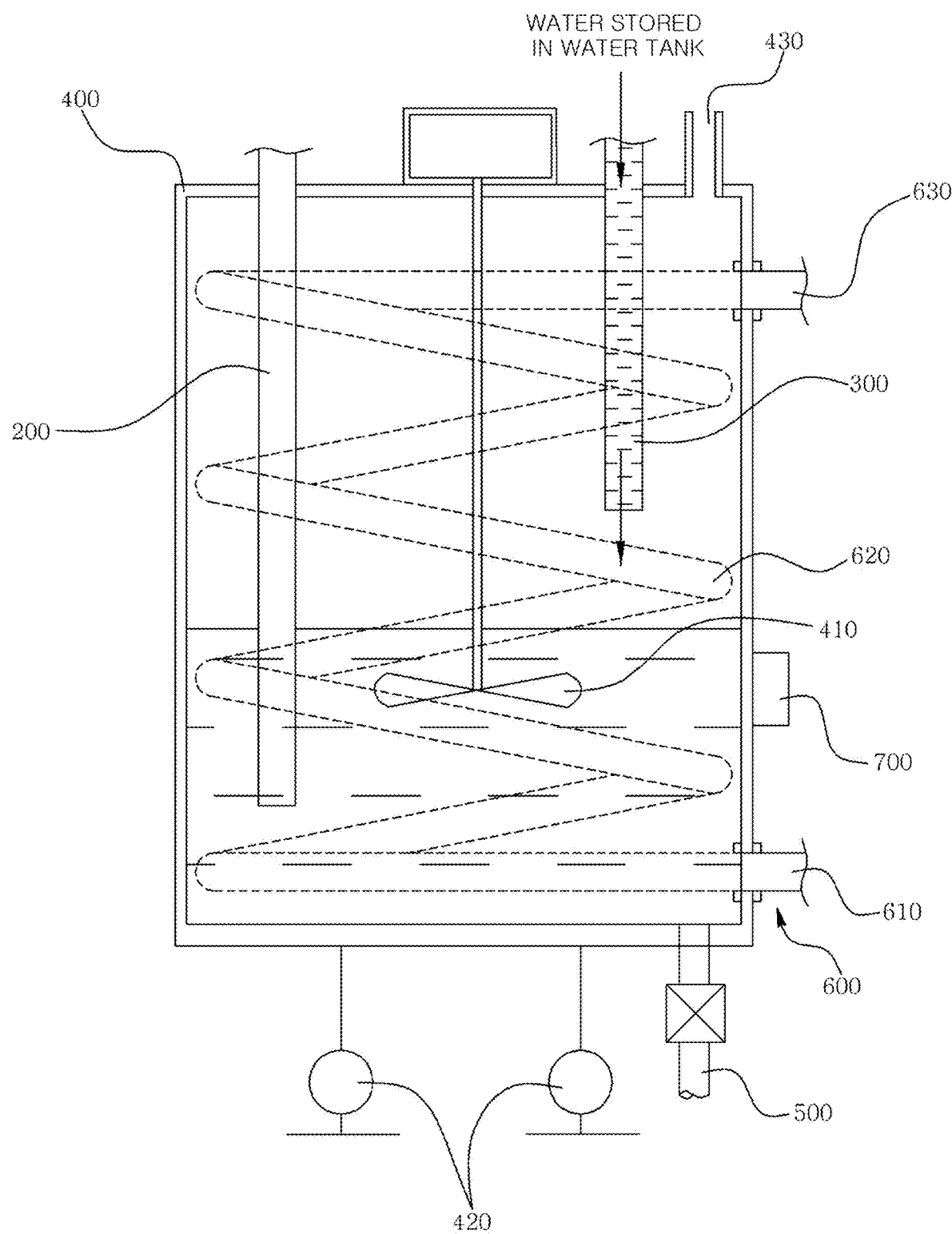
FIGS. 8 to 10 are main configuration diagrams illustrating the process of performing the step of preparing milk-of-lime of the embodiment of FIG. 4.
Figure 9:
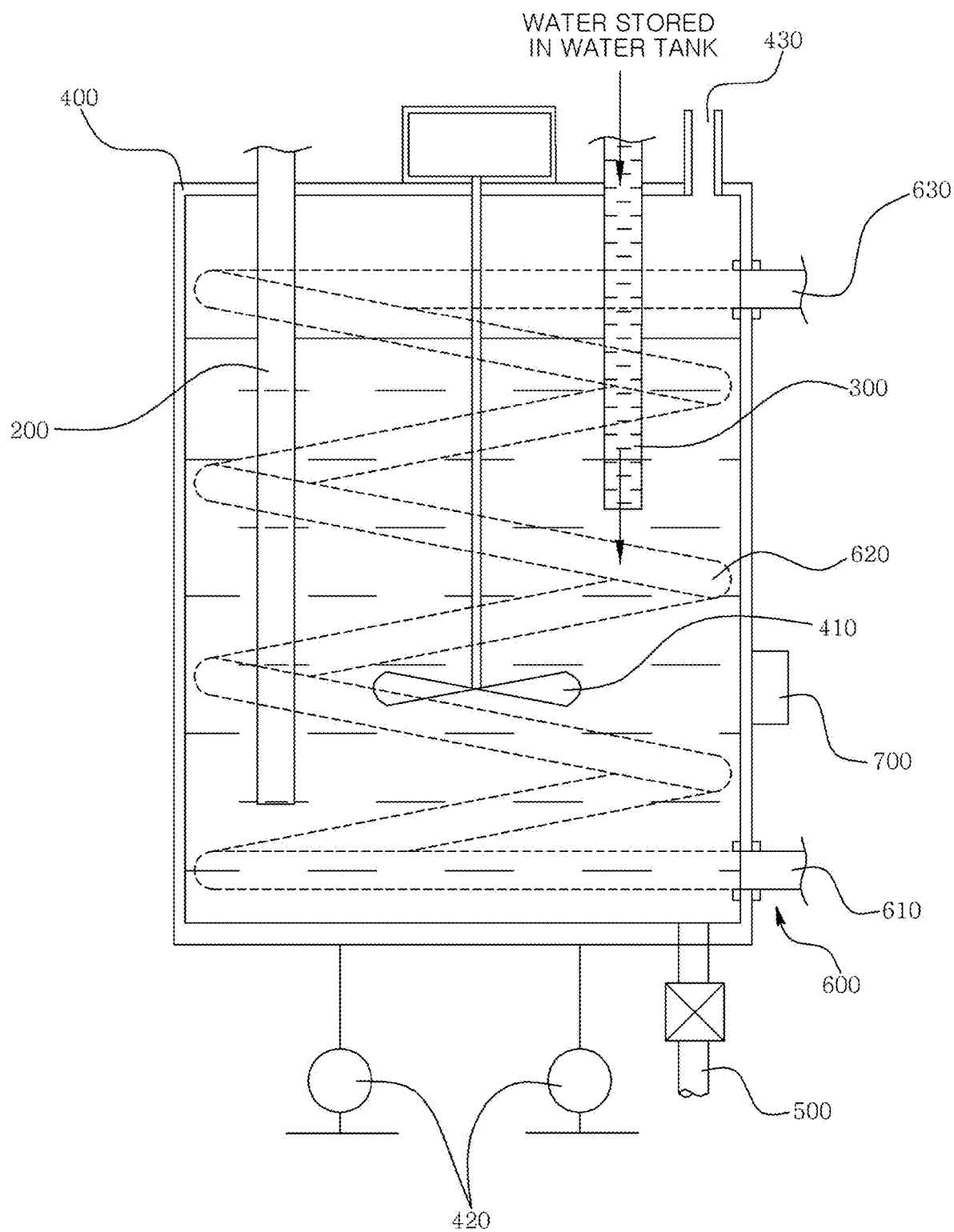

As illustrated in FIGS. 4 and 8 to 10, the milk-of-lime tank 400 receives the water from the other end of the water input pipe 300, and then the milk-of-lime tank 400 receives the calcine lime powder from the other end of the raw material input pipe 200, and then the received calcine lime powder and the water are stirred by means of the stirrer 310 installed inside the milk-of-lime tank 400, and therefore milk-of-lime is prepared and stored. That is, as illustrated in FIGS. 8 and 9, the water stored in the water tank 100 is supplied into the milk-of-lime tank 400 through the water input pipe 300 to fill an appropriate amount, and then the calcine lime powder is put into the water through the raw material input pipe 220. Therefore, the calcine lime powder being input through the raw material input pipe 200 is mixed with the water at the same time as it is put inside the milk-of-lime tank 400, and therefore there is an effect of inhibiting generation of dust. As the water and the calcine lime powder mixed inside the milk-of-lime tank 400 are stirred by means of the stirrer 410, due to a hydration reaction of the water ($H_2O$) and the calcine lime (CaO), milk-of-lime ($Ca(OH)_2$) is prepared. The stirrer 410 is a propeller type stirrer that is rotatably-installed inside the milk-of-lime tank 400, and a rotation motor for rotating the stirrer 410 is, with thermal-insulation, installed on an upper portion of the milk-of-lime tank 400.

As illustrated in FIGS. 4, 8 to 10 and 12, the discharge pipe 500 is installed at one side of the milk-of-lime tank 400 to discharge the stored milk-of-lime. That is, since the milk-of-lime prepared in the milk-of-lime tank 400 is stored in the milk-of-lime tank 400 as it is, and when being used, whenever the milk-of-lime is needed, the milk-of-lime can be discharged through the discharge pipe 500 to be used. Therefore, the milk-of-lime tank 400 is a multi-functional tank that is used for preparing, storing and using the milk-of-lime. Accordingly, there is no need to carry the milk-of-lime from a production site to a consumer, and thus logistics cost can be significantly reduced.

As described above, through the water tank 100, the raw material input pipe 200, the water input pipe 300, the milk-of-lime tank 400 and the discharge pipe 500, milk-of-lime can be prepared, stored and used. However, in case that the milk-of-lime is prepared from the calcine lime powder mixed with the water inside the milk-of-lime tank 400 through the hydration reaction, due to the heat generated during the hydration reaction, the temperature reaches 90 to 100° C. In order to use several tons or several dozen tons of milk-of-lime prepared to have a temperature of 90 to 100° C., the milk-of-lime must be naturally cooled and stored at room temperature 20±5° C. for one or two days until the temperature reaches room temperature, and thus there is a problem that it takes a long time to make a natural cooling for the final use of the milk-of-lime. Further, cooling the prepared high temperature milk-of-lime inside the milk-of-lime tank 400 by natural cooling is a waste of heat energy, and in terms of making use of such waste heat, if the water is supplied at a temperature of 40 to 50° C., the rate and efficiency of the hydration reaction will increase. Therefore, there is a need to use the waste heat to increase the temperature of the water. For this purpose, the waste heat recovery line 600 is installed as illustrated in FIG. 4.

Figure 12:
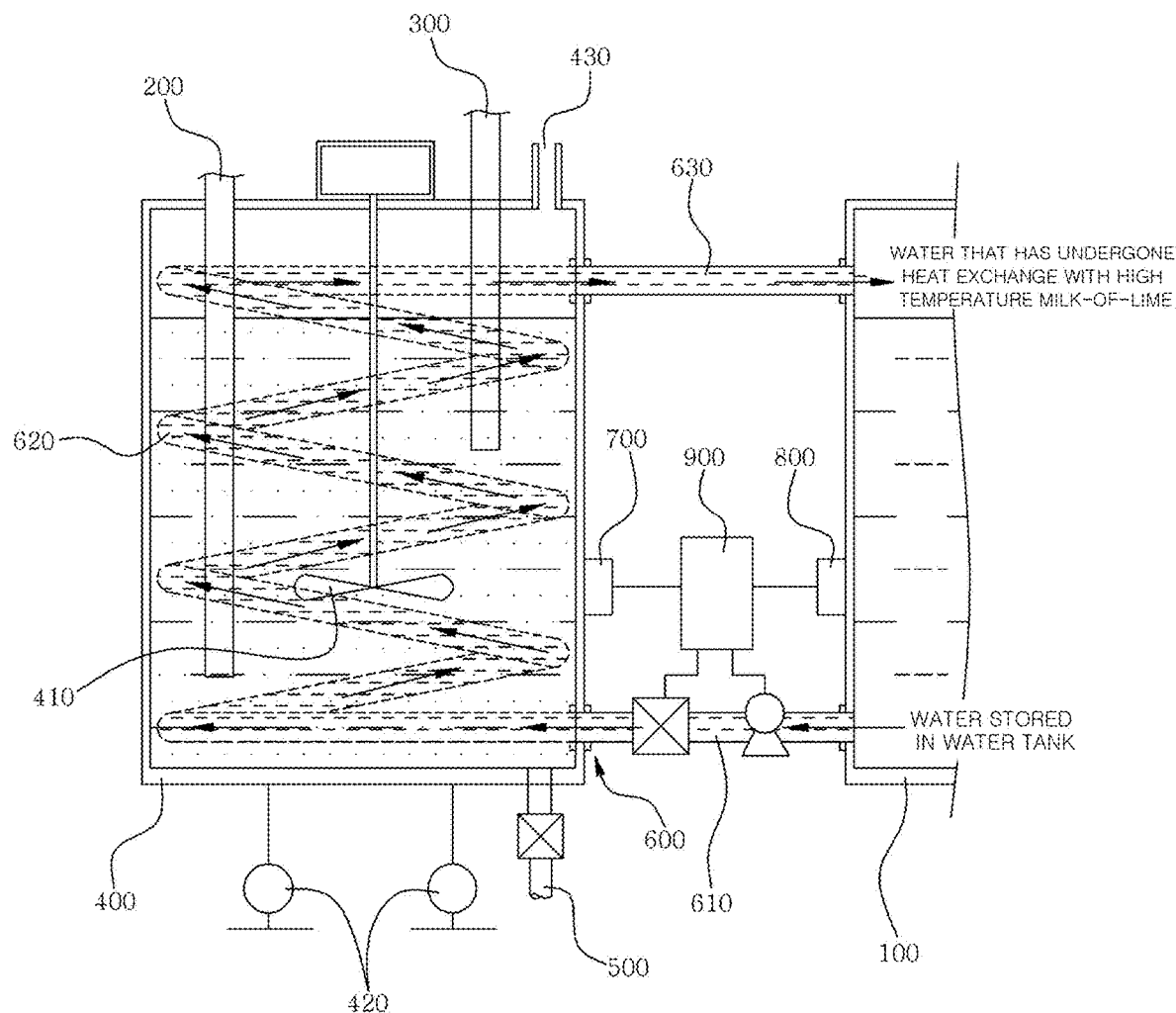
FIG. 12 is a main configuration diagram illustrating the process of performing the step of recovering waste heat of the embodiment of FIG. 11.

As illustrated in FIGS. 4 and 12, the waste heat recovery line 600 circulates the water by making the water stored inside the water tank 100 undergo heat exchange with the milk-of-lime stored inside the milk-of-lime tank 400 and then by storing the water back inside the water tank 100. More specifically, the waste heat recovery line 600 may include a transfer pipe 610 of which one end is connected with a lower portion of the water tank 100 and which transfers the water stored inside the water tank 100 to the other end; a heat exchange pipe 620 of which one end is connected with the transfer pipe 610 and of which the other end passes through the inside of the milk-of-lime tank 400; and a recovery pipe 630 of which one end is connected with the other end of the heat exchange pipe 620 and of which the other end is connected with an upper portion of the water tank 100.

That is, here, the milk-of-lime prepared and stored inside the milk-of-lime tank 400 has a temperature of 90 to 100° C., increased due to the exothermic reaction during the hydration reaction, while the water stored inside the water tank 100 is at a low or room temperature, and thus as the water stored inside the water tank 100 is transferred through the transfer pipe 610 of the waste heat recovery line 600 and passes through the heat exchange pipe 620, the water undergoes heat exchange with the milk-of-lime stored inside the milk-of-lime tank 400. Accordingly, the heat energy of the milk-of-lime stored inside the milk-of-lime tank 400 is transferred to the water passing through the heat exchange pipe 620, lowering the temperature of the milk-of-lime while raising the temperature of the water. This water with increased temperature is recovered back to the water tank 100 through the recovery pipe 630 of the waste heat recovery line 600, and stored therein.

Meanwhile, in order to increase the efficiency of waste heat recovery, it is desirable to reduce the heat loss that occurs as the milk-of-lime inside the milk-of-lime tank 400 and the warm water passing through the waste heat recovery line 600 and being stored inside the water tank 100 are exposed to external environment and thus release heat.

For this purpose, it is desirable to thermally insulate at least one of the milk-of-lime tank 400, the water tank 100, the water input pipe 300 and the waste heat recovery line 600 to retain heat. For example, it is possible to inhibit heat loss by manufacturing the milk-of-lime tank, the water tank, the water input pipe and the waste heat recovery line, that may be exposed externally, with thermal insulation material, or by attaching thermal insulation material. Other methods include installing the milk-of-lime tank 400, the water tank 100, the water input pipe 300 and the waste heat recovery line 600 underground.

The transfer pipe 610 of the waste heat recovery line 600 is connected with a lower portion of the water tank 100, and the recovery pipe 630 is connected with an upper portion of the water tank 100, wherein in the case of the water stored inside the water tank 100, the specific gravity of the water differs depending on the temperature of the water, since the lower the water temperature, the higher the specific gravity of the water, and the higher the water temperature, the lower the specific gravity of the water. That is, even with the same water stored inside the water tank 100, a portion of the water having a low temperature moves to a lower portion of the water tank 100, while a portion of the water having a high temperature moves to an upper portion of the water tank 100, and thus in order to have a good heat exchange efficiency, the water to be transferred to the heat exchange pipe 620 through the transfer pipe 610 of the waste heat recovery line 600 for the heat exchange should be the water which have a relatively low temperature and which had moved to a lower portion of the water tank 100.

Accordingly, by recovering the waste heat generated during preparation of milk-of-lime inside the milk-of-lime tank 400 through the waste heat recovery line 600 and by delivering it to the water stored in the water tank 100, it is possible to maintain the temperature of the water stored in the water tank 100 at the optimal temperature necessary for the hydration reaction, and by supplying such warm water stored in the water tank 100 to the inside of the milk-of-lime tank 400 through the water input pipe 300, it is possible to increase the reaction rate and reaction efficiency of the hydration reaction with the calcine lime powder. Especially, without having to cool the high temperature milk-of-lime prepared in the milk-of-lime tank 400 for days through natural cooling, using the waste heat recovery line 600, it is possible to quickly cool the milk-of-lime to the temperature necessary for usage, thereby reducing the preparation time of the milk-of-lime.

Figure 10:
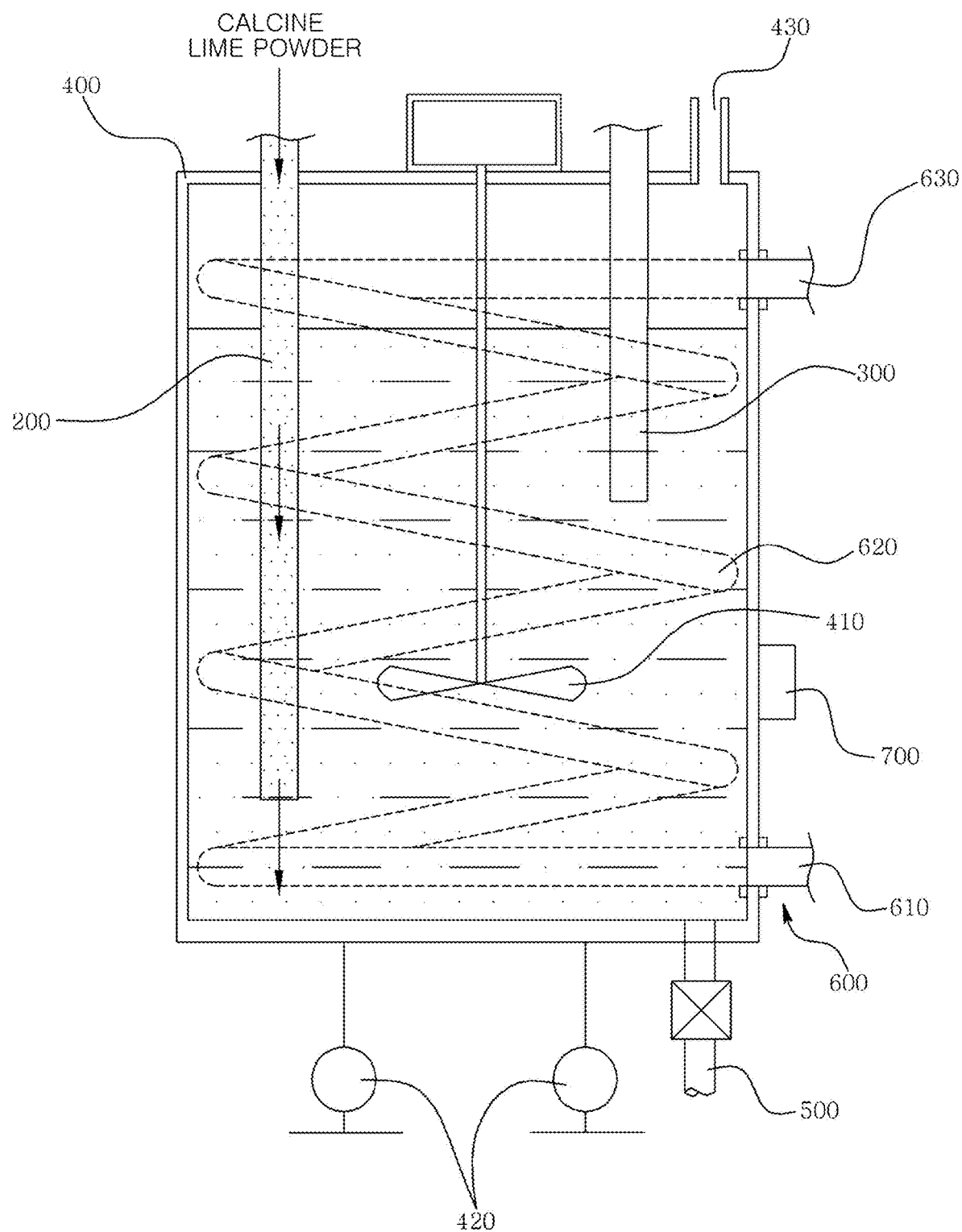

In this case, a control algorithm for operating the waste heat recovery line 600 is needed, and for this purpose, a milk-of-lime temperature sensor 700, a water temperature sensor 800 and a controller 900 may be further included. That is, as illustrated in FIGS. 4, 10 and 12, the milk-of-lime temperature sensor 700 senses the temperature of the milk-of-lime stored inside the milk-of-lime tank 400, and as illustrated in FIGS. 4, 6 and 12, the water temperature sensor 800 senses the temperature of the water stored inside the water tank 100. Here, as illustrated in FIGS. 4 and 12, the controller 900 receives the sensed temperature value from each of the milk-of-lime temperature sensor 700 and the water temperature sensor 800, and operates the waste heat recovery line 600.

More specifically, for the optimal reaction rate and reaction efficiency for the hydration reaction during preparation of milk-of-lime, the supply temperature of the water should be in the range of 40 to 50° C., the water stored in the water tank 100 should be maintained at the optimal temperature, and of course, the milk-of-lime tank 400 should have the prepared milk-of-lime stored inside, and the temperature should be higher than the optimal temperature of the water. Therefore, if the temperature value received from the milk-of-lime temperature sensor 700 is 40° C. or above, the controller 900 operates the waste heat recovery line 600 such that the temperature value received from the water temperature sensor 800 has a range of 40 to 50° C.

Meanwhile, a meter is needed for measuring the weight of the milk-of-lime and the water stored in the milk-of-lime tank 400 and the water tank 100, respectively. That is because, although usually there is no problem since a certain amount of calcine lime powder and water are supplied at a time according to the size of the tank, it is necessary to vary the preparation amount of the milk-of-lime or check the amount of the prepared milk-of-lime or the remaining water. That is, as illustrated in FIGS. 4, 8 to 10 and 12, a meter 420 is installed in the milk-of-lime tank 400 to measure the supply amount of the calcine lime powder being supplied from the raw material input pipe 200 and the water being supplied from the water input pipe 300. Although reference numerals are not indicated, in the water tank 100, there is also a meter installed as illustrated in FIGS. 4 and 6, to measure the supply amount of the water being supplied from the water supply pipe 110 or the supply amount of the water being supplied to the water input pipe 300.

Further, when the calcine lime powder and the water are stirred by means of the stirrer 410 of the milk-of-lime tank 400, an exothermic reaction occurs due to the hydration reaction, and accordingly, vapor is generated. Therefore, as illustrated in FIGS. 4, 8 to 10, 12 and 13, a vapor discharge hole 430 may be installed on an upper portion of the milk-of-lime tank 400 so that the vapor generated from inside the milk-of-lime tank 400 can be discharged to the outside.

Here, when the vapor is discharged as it is through the vapor discharge hole 430, due to the discharge of the vapor, the supply amount of the water inside the milk-of-lime tank 400 will decrease, thereby changing the concentration of the limestone. Further, generation of the vapor may damage the appearance. Thus, in order to inhibit this, as illustrated in FIG. 13, a spray pipe 310 and a spray nozzle 320 may be further included.

Figure 13:
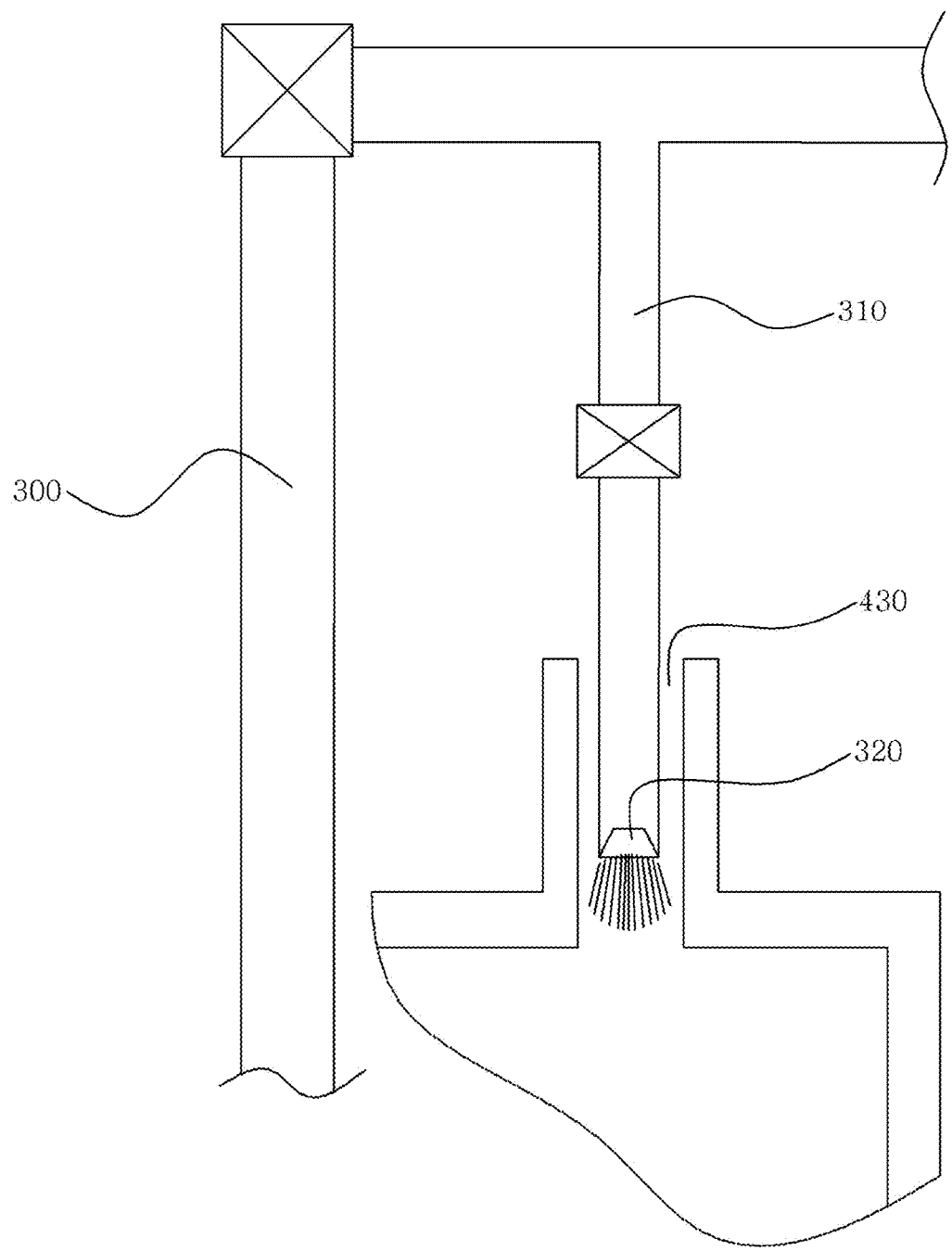
FIG. 13 is a main configuration diagram illustrating a state of the embodiment of FIG. 4 where a vapor discharge hole, a spray pipe and a spray nozzle are additionally installed.

That is, as illustrated in FIG. 13, one end of the spray pipe 310 is bifurcated from the water input pipe 300 to receive the water from the water input pipe 300, and the other end of the spray pipe 310 is located inside the vapor discharge hole 430 to discharge the water. Further, the spray nozzle 320 is installed at the other end of the spray pipe 310, to spray the water being discharged from the spray pipe 310 in order to condense the vapor being discharged through the vapor discharge hole 430.

When the water is pressurized and spurted through the spray nozzle 320 and sprayed to the vapor, a condensation phenomenon occurs where a portion of the vapor changes to liquid. Accordingly, the vapor to be discharged through the vapor discharge hole 430 is condensed and liquefied, and then introduced back into the milk-of-lime tank 400, thereby significantly reducing the amount of vapor being discharged.

Next, hereinafter, a desirable embodiment of a milk-of-lime preparation method using waste heat recovery line according to the present disclosure will be described in detail with reference to the drawings attached.

Figure 3:
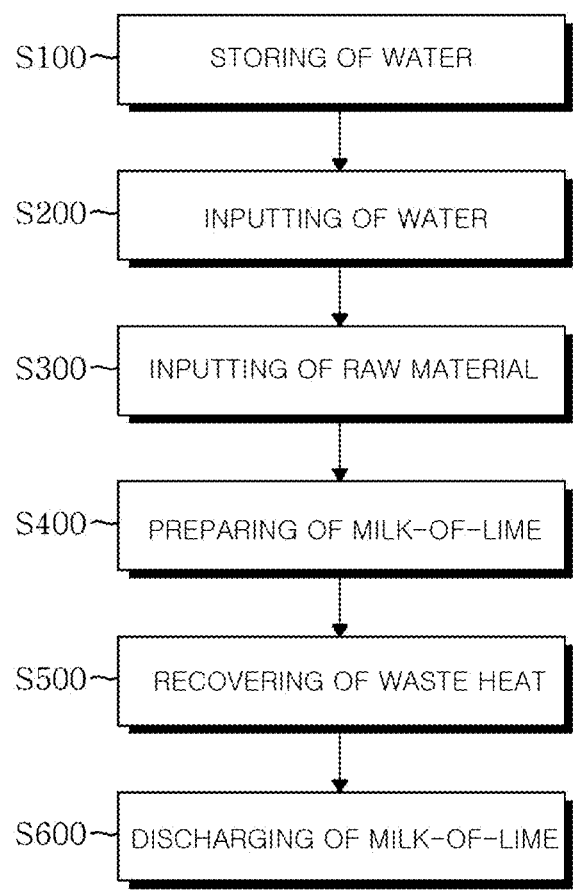
FIG. 3 is a block diagram illustrating an embodiment of a milk-of-lime preparation method using waste heat recovery line according to the present disclosure.
Figure 11:
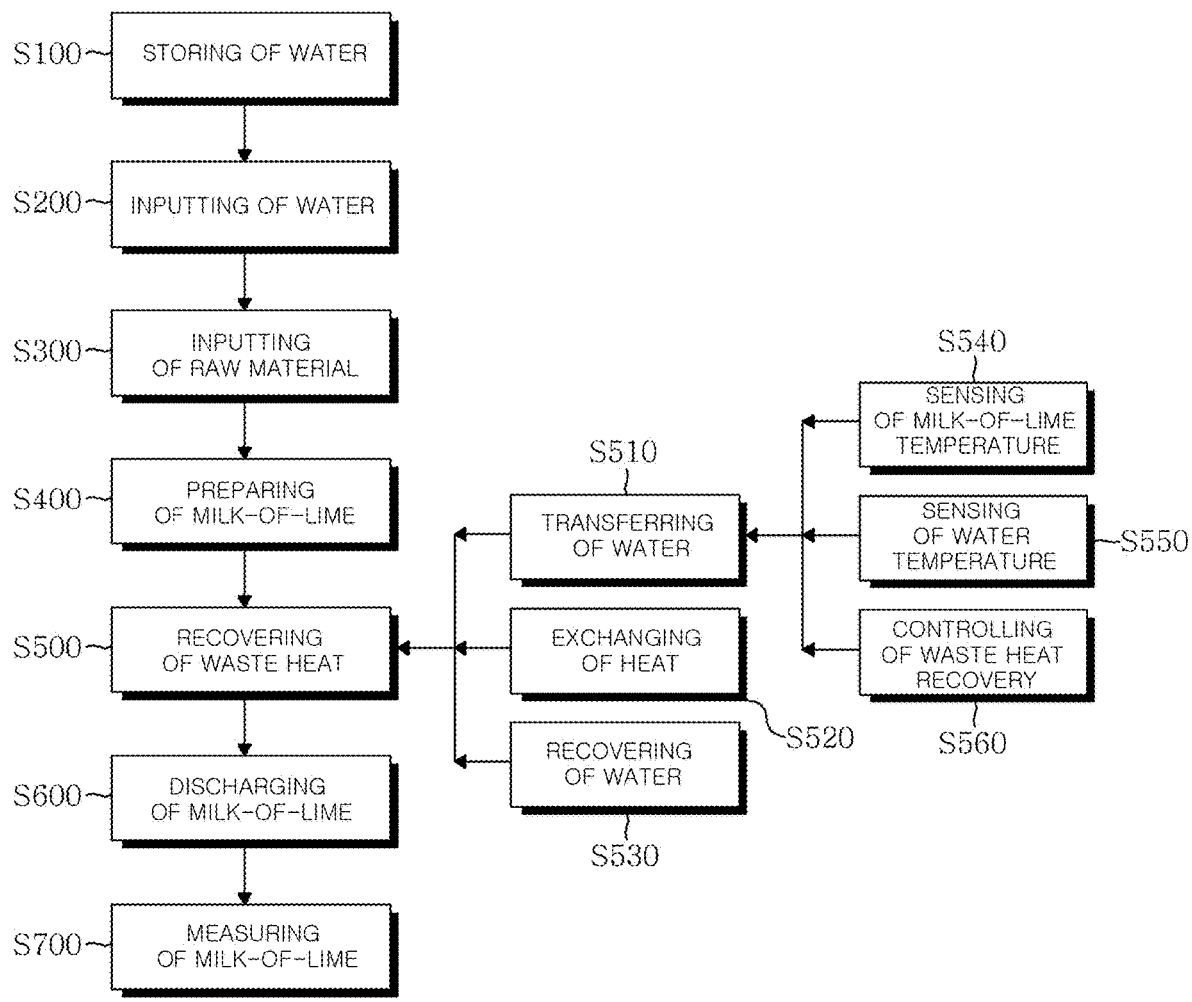
FIG. 11 is a block diagram illustrating another embodiment of the milk-of-lime preparation method using waste heat recovery line according to the present disclosure.

As illustrated in FIG. 3, the milk-of-lime preparation method using waste heat recovery line according to the present disclosure consists of steps of storing of water (S100), inputting of water (S200), inputting of raw material (S300), preparing of milk-of-lime (S400), recovering of waste heat (S500) and discharging of milk-of-lime (S600), and as illustrated in FIG. 11, measuring of milk-of-lime (S700) may be further included. Further, the recovering of waste heat (S500) may include steps of transferring of water (S510), exchanging of heat (S520) and recovering of water (S530), and may further include steps of sensing of milk-of-lime temperature (S540), sensing of water temperature (S550) and controlling of waste heat recovery (S560).

Further, as illustrated in FIGS. 4 to 10, 12 and 13, components for performing a milk-of-lime preparation method using waste heat recovery line according to the present disclosure include a water tank 100, a raw material input pipe 200, a water input pipe 300, a milk-of-lime tank 400, a discharge pipe 500 and a waste heat recovery line 600. Further, the waste heat recovery line 600 may include a transfer pipe 610, a heat exchange pipe 620 and a recovery pipe 630, and may further include a milk-of-lime temperature sensor 700, a water temperature sensor 800 and a controller 900.

Figure 5:
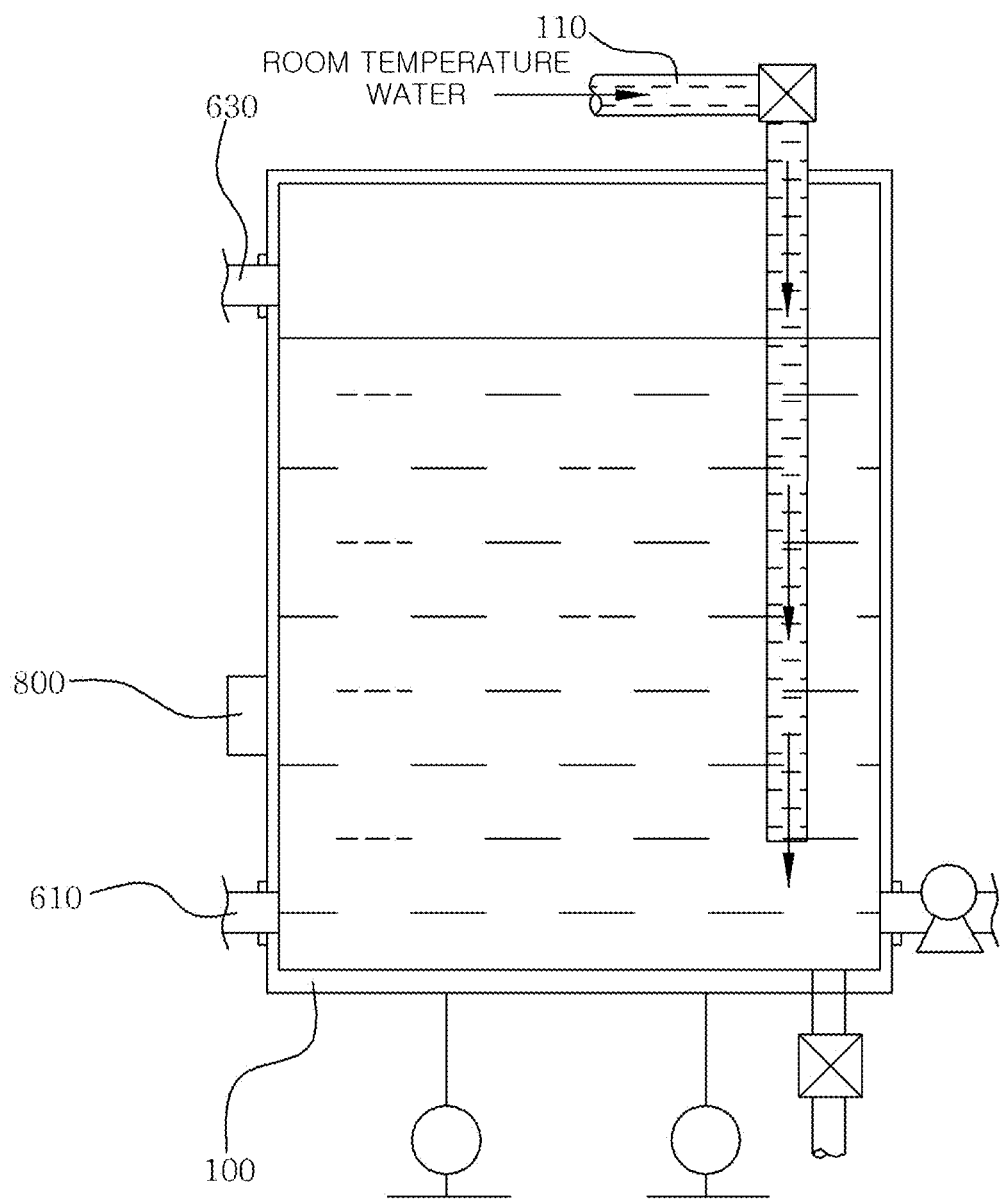
FIG. 5 is a main configuration diagram illustrating the process of performing the step of storing water of the embodiment of FIG. 3.

As illustrated in FIGS. 3 to 5, the storing of water (S100) receives room temperature water from the water supply pipe 110 and stores the received water inside the water tank 100. The water being supplied from the water supply pipe 110 is industrial use water or engineering use water. It may be tap water or underground water from the area, and it may be at room temperature in summer seasons and low temperature in winter seasons. The water tank 100 receives the room temperature water through the water supply pipe 110 and stores the received water therein. Then, at the inputting of water (S200) that will be described hereinafter, the water tank 100 supplies the stored water through one end toward the other end. Here, the water stored inside the water tank 100 may be water of which the temperature has increased due to heat exchange through the waste heat recovery line 600 that will be described hereinafter.

As illustrated in FIGS. 3, 4 and 6, the inputting of water (S200) transfers the water stored inside the water tank 100 from one end to the other end of the water input pipe 300 that is connected with the water tank 100. That is, from one end of the water input pipe 300, the water stored inside the water tank 100 is supplied, and through the other end of the water input pipe 300, the water is transferred to the inside of the milk-of-lime tank 300 that will be described hereinafter.

As illustrated in FIGS. 3, 4 and 7, the inputting of raw material (S300) moves the calcine lime powder from one end to the other end of the raw material input pipe 200 through pressure supply from the BCT vehicle 210 that carries the calcine lime powder. Here, the BCT vehicle 210 is a Bulk Cement Trailer, which is a truck that carries raw material in powder form. Specifically, the BCT vehicle 210 loads the calcine lime powder, which is a raw material in powder form, on a tank, and carries the calcine lime powder to a consumer, and then blows out the calcine lime powder inside the tank with the compressed air being generated from a compressor mounted on the vehicle. The calcine lime powder being supplied from the BCT vehicle 210 will move from one end to the other end of the raw material input pipe 200. That is, one end of the raw material input pipe 200 is connected with the BCT vehicle 210, and the other end is connected up until the inside of the milk-of-lime tank 200 that will be described hereinafter.

As illustrated in FIGS. 3, 4 and 8 to 10, at the step of the preparing of milk-of-lime (S400), the milk-of-lime tank 400 receives the water from the other end of the water input pipe 300 to the inside of the milk-of-lime tank and then the milk-of-lime tank 400 receives the calcine lime powder from the other end of the raw material input pipe 200, and then the supplied calcine lime powder and the water are stirred by means of the stirrer 410 installed inside the milk-of-lime tank 400, and thus milk-of-lime is prepared and stored. That is, as illustrated in FIGS. 8 and 9, the water stored in the water tank 100 is supplied to the inside of the milk-of-lime tank 400 through the water input pipe 300 so that an appropriate amount is filled, and then the calcine lime powder is put into the filled water through the raw material input pipe 200. Therefore, as the calcine lime powder being input through the raw material input pipe 200 is mixed with the water at the same of being input into the milk-of-lime tank 400, there is an effect of inhibiting generation of dust. As the water and the calcine lime powder mixed inside the milk-of-lime tank 400 are stirred by means of the stirrer 410, due to the hydration reaction of the water ($H_2O$) and the calcine lime (CaO), milk-of-lime ($Ca(OH)_2$) is prepared. The stirrer 410 is a propeller type stirrer that is rotatably-installed inside the milk-of-lime tank 400, and the rotation motor for rotating the stirrer 410 is thermally-insulatively installed on an upper portion of the milk-of-lime tank 400.

As described above, through the storing of water (S100), the inputting of water (S200), the inputting of raw material (S300) and the preparing of milk-of-lime (S400), milk-of-lime may be prepared and stored. However, in this case, since the milk-of-lime is prepared from the calcine lime powder mixed with the water inside the milk-of-lime tank 400 through the hydration reaction, due to the heat generated during the hydration reaction, the temperature reaches 90 to 100° C. In order to use several tons or several dozen tons of milk-of-lime having a temperature of 90 to 100° C., the milk-of-lime must be cooled and stored at room temperature for natural cooling for one or two days until the temperature reaches room temperature 20±5° C., and thus there is a problem that it takes a long time to make a natural cooling for the final use of the milk-of-lime. Further, cooling the prepared high temperature milk-of-lime inside the milk-of-lime tank 400 by natural cooling is a waste of heat energy, and in terms of making use of such waste heat, if the water is supplied at a temperature of 40 to 50° C., the rate and efficiency of the hydration reaction will increase. Therefore, there is a need to use the waste heat to increase the temperature of the water. For this purpose, as illustrated in FIGS. 3 and 11, recovering of waste heat (S500) may be further included.

As illustrated in FIGS. 3, 4, 11 and 12, the recovering of waste heat (S500) circulates the water through the waste heat recovery line 600 by making the water stored inside the water tank 100 undergo heat exchange with the milk-of-lime stored inside the milk-of-lime tank 400 and then by storing the water back inside the water tank 100. More specifically, the waste heat recovery line 600 may include a transfer pipe 610 of which one end is connected with a lower portion of the water tank 100 and which transfers the water stored inside the water tank 100 to the other end; a heat exchange pipe 620 of which one end is connected with the transfer pipe 610 and of which the other end passes through the inside of the milk-of-lime tank 400; and a recovery pipe 630 of which one end is connected with the other end of the heat exchange pipe 620 and of which the other end is connected with an upper portion of the water tank 100. Accordingly, the recovering of waste heat (S500) may include steps of transferring of water (S510), exchanging of heat (S520) and recovering of water (S530).

That is, as illustrated in FIG. 12, the transferring of water (S510) transfers the water to a lower portion of the water tank 100 through the transfer pipe 610, and the exchanging of heat (S520) lets the water transferred from the transfer pipe 610 undergo heat exchange with the milk-of-lime stored inside the milk-of-lime tank 400 through the heat exchange pipe 620, and the recovering of water (S530) recovers the water that has undergone heat exchange through the heat exchange pipe 620 back to an upper portion of the water tank 100.

The milk-of-lime prepared and stored inside the milk-of-lime tank 400 has a temperature 90 to 100° C., increased due to the exothermic reaction during the hydration reaction, while the water stored inside the water tank 100 is at a low or room temperature, and thus as the water stored inside the water tank 100 is transferred through the transfer pipe 610 of the waste heat recovery line 600 and passes through the heat exchange pipe 620, the water undergoes heat exchange with the milk-of-lime stored inside the milk-of-lime tank 400. Accordingly, the heat energy of the milk-of-lime stored inside the milk-of-lime tank 400 is transferred to the water passing through the heat exchange pipe 620, lowering the temperature of the milk-of-lime while raising the temperature of the water. This water with increased temperature is recovered back to the water tank 100 through the recovery pipe 630 of the waste heat recovery line 600, and stored therein.

The transfer pipe 610 of the waste heat recovery line 600 is connected with a lower portion of the water tank 100, and the recovery pipe 630 is connected with an upper portion of the water tank 100, wherein in the case of the water stored inside the water tank 100, the specific gravity of the water differs depending on the temperature of the water, since the lower the water temperature, the higher the specific gravity of the water, and the higher the water temperature, the lower the specific gravity of the water. That is, even with the same water stored inside the water tank 100, a portion of the water having a low temperature moves to a lower portion of the water tank 100, while a portion of the water having a high temperature moves to an upper portion of the water tank 100, and thus in order to have a good heat exchange efficiency, the water to be transferred to the heat exchange pipe 620 through the transfer pipe 610 of the waste heat recovery line 600 for the heat exchange should be the water which have a relatively low temperature and which had moved to a lower portion of the water tank 100.

Accordingly, by recovering the waste heat generated during preparation of milk-of-lime inside the milk-of-lime tank 400 through the waste heat recovery line 600 and by delivering it to the water stored in the water tank 100, it is possible to maintain the temperature of the water stored in the water tank 100 at the optimal temperature necessary for the hydration reaction, and by supplying such warm water stored in the water tank 100 to the inside of the milk-of-lime tank 400 through the water input pipe 300, it is possible to increase the reaction rate and reaction efficiency of the hydration reaction with the calcine lime powder. Especially, without having to cool the prepared high temperature milk-of-lime in the milk-of-lime tank 400 for days through natural cooling, using the waste heat recovery line 600, it is possible to quickly cool the milk-of-lime to the temperature necessary for usage, thereby reducing the preparation time of the milk-of-lime.

In this case, a control algorithm for operating the waste heat recovery line 600 is needed, and for this purpose, the recovering of waste heat (S500) may further include steps of sensing of milk-of-lime temperature (S540), sensing of water temperature (S550) and controlling of waste heat recovery (S560). That is, the sensing of milk-of-lime temperature (S540) senses the temperature of the milk-of-lime stored inside the milk-of-lime tank 400 through the milk-of-lime temperature sensor 700, the sensing of water temperature (S550) senses the temperature of the water stored inside the water tank 100 through the water temperature sensor 800, and the controlling of waste heat recovery (S560) receives the sensed temperature value from each of the milk-of-lime temperature sensor 700 and the water temperature sensor 800, and controls an operation of the transferring of water (S510). Such control of the waste heat recovery line 600 is performed by means of the controller 900, and at the recovering of waste heat (S500), the waste heat recovery line 600 operates depending on whether the transferring of water (S510) is performed, therefore it will suffice that the controller 900 simply controls whether to perform the transferring of water (S510).

More specifically, for the optimal reaction rate and reaction efficiency for the hydration reaction during preparation of milk-of-lime, the supply temperature of the water should be in the range of 40 to 50° C., the water stored in the water tank 100 should be maintained at the optimal temperature, and of course, the milk-of-lime tank 400 should have the prepared milk-of-lime stored inside, and the temperature should be higher than the optimal temperature of the water. Therefore, the controlling of waste heat recovery (S500) controls such that the transferring of water (S510) is performed such that, if the temperature value received from the milk-of-lime temperature sensor 700 is 40° C. or above, the temperature value received from the water temperature sensor 800 has a range of 40 to 50° C.

The high temperature milk-of-lime prepared and stored in the milk-of-lime tank 400 through performing the recovering of waste heat (S500) as described above is cooled within a shorter period of time compared to natural cooling due to heat exchange with the water stored in the water tank 100, and the heat energy of the milk-of-lime is transferred to the water stored in the water tank 100 so that the water can have the optimal temperature necessary for the hydration reaction. Such final milk-of-lime prepared and cooled and then stored in the milk-of-lime tank 400 as described above must be discharged to be used.

That is, as illustrated in FIGS. 3 and 4, the discharging of milk-of-lime (S600) discharges the milk-of-lime prepared and stored inside the milk-of-lime tank 400 through the discharge pipe 500 installed at one side of the milk-of-lime tank 400. That is, the milk-of-lime prepared in the milk-of-lime tank 400 is stored in the milk-of-lime tank 400 as it is, and when being used, whenever the milk-of-lime is needed, the milk-of-lime can be discharged through the discharge pipe 500 to be used. Therefore, the milk-of-lime tank 400 is a multi-functional tank that is used for preparing, storing and using the milk-of-lime. Accordingly, there is no need to carry the milk-of-lime from the production site to the consumer, and thus logistics cost can be significantly reduced.

Meanwhile, a meter is needed for measuring the weight of the milk-of-lime and the water stored in the milk-of-lime tank 400 and the water tank 100, respectively. That is because, although usually there is no problem since a certain amount of calcine lime powder and water are supplied at a time according to the size of the tank, it is necessary to vary the preparation amount of the milk-of-lime or check the amount of the prepared milk-of-lime or the remaining water. Therefore, as illustrated in FIG. 11, through the meter 420 installed in the milk-of-lime tank 400, the measuring of milk-of-lime (S700) measures the supply amount of the calcine lime powder being supplied from the raw material input pipe 200 and the water being supplied from the water input pipe 300. Although reference numerals are not indicated, also in the case of the water tank 100, it is possible to measure the supply amount of the water being supplied from the water supply pipe 110 or the supply amount of the water being supplied to the water input pipe 300.

Further, when the calcine lime powder and the water are stirred by means of the stirrer 410 of the milk-of-lime tank 400, the exothermic reaction occurs due to the hydration reaction, and accordingly, vapor is generated. Therefore, as illustrated in FIGS. 4, 8 to 10, 12 and 13, a vapor discharge hole 430 may be installed on an upper portion of the milk-of-lime tank 400 so that the vapor generated from inside the milk-of-lime tank 400 can be discharged to the outside.

Here, when the vapor is discharged as it is through the vapor discharge hole 430, due to the discharge of the vapor, the supply amount of the water inside the milk-of-lime tank 400 will decrease, thereby changing the concentration of the limestone. Further, generation of the vapor may damage the appearance. Thus, in order to inhibit this, as illustrated in FIG. 13, a spray pipe 310 and a spray nozzle 320 may be further included.

That is, as illustrated in FIG. 13, one end of the spray pipe 310 is bifurcated from the water input pipe 300 to receive the water from the water input pipe 300, and the other end of the spray pipe 310 is located inside the vapor discharge hole 430 to discharge the water. Further, the spray nozzle 320 is installed at the other end of the spray pipe 310, to spray the water being discharged from the spray pipe 310 in order to condense the vapor being discharged through the vapor discharge hole 430.

When the water is pressurized and spurted through the spray nozzle 320 and sprayed to the vapor, a condensation phenomenon occurs where a portion of the vapor changes to liquid. Accordingly, the vapor to be discharged through the vapor discharge hole 430 is condensed and liquefied, and then introduced back into the milk-of-lime tank 400, thereby significantly reducing the amount of vapor being discharged.

The milk-of-lime preparation method using waste heat recovery line according to the present disclosure as described above recovers the waste heat generated during preparation of liquid milk-of-lime through the waste heat recovery line 600 and delivers the recovered waste heat to the water so as to supply the water at the optimal temperature necessary for the hydration reaction, and therefore has an effect of increasing the reaction efficiency and reducing the preparation time of the milk-of-lime.

The embodiments of the present disclosure described above and illustrated in the drawings should not be construed as limiting the technical idea of the present invention. The protection scope of the present invention is limited only by the matters described in the claims, and those skilled in the art can change the technical idea of the present invention in various forms. Therefore, such improvements and modifications will fall within the protection scope of the present invention as long as it will be apparent to those skilled in the art.

100: WATER TANK
200: RAW MATERIAL INPUT PIPE
300: WATER INPUT PIPE
310: SPRAY PIPE
400: MILK-OF-LIME TANK
420: METER
500: DISCHARGE PIPE
600: WASTE HEAT RECOVERY LINE
620: HEAT EXCHANGE PIPE
700: MILK-OF-LIME TEMPERATURE SENSOR
800: WATER TEMPERATURE SENSOR
900: CONTROLLER
S100: STORING OF WATER
S200: INPUTTING OF WATER
S300: INPUTTING OF RAW MATERIAL
S400: PREPARING OF MILK-OF-LIME
S500: RECOVERING OF WASTE HEAT
S510: TRANSFERRING OF WATER
S520: EXCHANGING OF HEAT
S530: RECOVERING OF WATER
S540: SENSING OF MILK-OF-LIME TEMPERATURE
S550: SENSING OF WATER TEMPERATURE
S560: CONTROLLING OF WASTE HEAT RECOVERY
S600: DISCHARGING OF MILK-OF-LIME
S700: MEASURING OF MILK-OF-LIME

110: WATER SUPPLY PIPE
210: BCT VEHICLE

320: SPRAY NOZZLE
410: STIRRER
430: VAPOR DISCHARGE HOLE

610: TRANSFER PIPE
630: RECOVERY PIPE

What is claimed is:

1. A milk-of-lime preparation apparatus having a waste heat recovery line, comprising:
    a water tank that receives room temperature water from a water supply pipe and stores the received water inside the water tank;
    a raw material input pipe that transfers calcine lime powder from a first end to a second end of the raw material input pipe through pressure supply from a BCT vehicle that carries the calcine lime powder;
    a water input pipe of which a first end is connected with the water tank, and that receives the water stored inside the water tank and transfers the received water to a second end of the water input pipe;
    a milk-of-lime tank that receives the water from the second end of the water input pipe, that receives the calcine lime powder from the second end of the raw material input pipe, and that stirs the received calcine lime powder and the water by means of a stirrer installed inside the milk-of-lime tank, to prepare and store milk-of-lime;
    a discharge pipe that is installed at one side of the milk-of-lime tank to discharge the milk-of-lime stored inside the milk-of-lime tank; and
    a waste heat recovery line that circulates the water such that the water stored inside the water tank is transferred to the milk-of-lime tank to exchange heat with the milk-of-lime stored inside the milk-of-lime tank and then returns into the water tank to be stored back inside the water tank,
    wherein the second end of the water input pipe is connected to the inside of the milk-of-lime tank to supply the water stored in the water tank to the milk-of-lime tank at a temperature for a hydration reaction, thereby increasing a reaction rate and efficiency of the hydration reaction.

2. The milk-of-lime preparation apparatus having a waste heat recovery line, according to claim 1, wherein the waste heat recovery line comprises:
    a transfer pipe of which a first end is connected with a lower portion of the water tank, and that transfers the water stored inside the water tank to a second end of the transfer pipe;
    a heat exchange pipe of which a first end is connected with the transfer pipe and of which a second end passes through the inside of the milk-of-lime tank; and
    a recovery pipe of which a first end is connected with the second end of the heat exchange pipe, and of which a second end is connected with an upper portion of the water tank.

3. The milk-of-lime preparation apparatus having a waste heat recovery line, according to claim 1, further comprising:
    a milk-of-lime temperature sensor that senses a temperature of the milk-of-lime stored inside the milk-of-lime tank;
    a water temperature sensor that senses a temperature of the water stored inside the water tank; and
    a controller that receives a temperature value sensed from each of the milk-of-lime temperature sensor and the water temperature sensor, and operates the waste heat recovery line.

4. The milk-of-lime preparation apparatus having a waste heat recovery line, according to claim 3,
    wherein if the temperature value received from the milk-of-lime temperature sensor is 40° C. or above, the controller is configured to operate the waste heat recovery line such that the temperature value received from the water temperature sensor has a range of 40 to 50° C.

5. The milk-of-lime preparation apparatus having a waste heat recovery line, according to claim 1, further comprising:
    a meter that is installed in the milk-of-lime tank to measure a supply amount of the calcine lime powder being supplied from the raw material input pipe and a supply amount of the water being supplied from the water input pipe.

6. The milk-of-lime preparation apparatus having a waste heat recovery line, according to claim 1,
    wherein the milk-of-lime tank further comprises a vapor discharge hole that is installed on an upper portion such that vapor generated by the hydration reaction of the calcine lime powder and the water can be discharged outside;
    and the milk-of-lime preparation apparatus further comprises:

a spray pipe of which a first end is bifurcated from the water input pipe to receive the water from the water input pipe and of which a second end is located inside the vapor discharge hole to discharge the water; and a spray nozzle that is installed at the second end of the spray pipe to spray the water being discharged from the spray pipe such that the vapor being discharged through the vapor discharge hole is condensed.

7. The milk-of-lime preparation apparatus having a waste heat recovery line, according to claim 1, wherein at least one or more of the milk-of-lime tank, the water tank, the water input pipe, and the waste heat recovery line is thermally-insulated.

8. The milk-of-lime preparation apparatus having a waste heat recovery line, according to claim 1, wherein at least one or more of the milk-of-lime tank, the water tank, the water input pipe, and the waste heat recovery line is installed underground.

9. A milk-of-lime preparation method using a waste heat recovery line, comprising:

a water-storing step of receiving room temperature water from a water supply pipe and storing the received water inside a water tank;

a water-inputting step of transferring the water stored inside the water tank from a first end of a water input pipe connected to the water tank to a second end of the water input pipe;

a raw-material inputting step of transferring calcine lime powder from a first end of a raw material input pipe to a second end of the raw material input pipe through pressure supply from a BCT vehicle that carries the calcine lime powder;

a milk-of-lime preparing step comprising: receiving the water from the second end of the water input pipe to the inside of a milk-of-lime tank; receiving the calcine lime powder from the second end of the raw material input pipe; and stirring the received calcine lime powder and the water through a stirrer installed inside the milk-of-lime tank, to prepare and store milk-of-lime;

a waste heat recovering step of circulating the water stored inside the water tank such that the water is transferred to the milk-of-lime tank to exchange heat with the milk-of-lime stored inside the milk-of-lime tank and then returns into the water tank to be stored back inside the water tank;

a milk-of-lime discharging step of discharging the milk-of-lime prepared and stored inside the milk-of-lime tank, through a discharge pipe installed at one side of the milk-of-lime tank; and a step of supplying the water stored in the water tank to the milk-of-lime tank at a temperature for a hydration reaction, the water being supplied to the milk-of-lime tank by the water input pipe having the second end thereof connected to the inside of the milk-of-lime tank, thereby increasing a reaction rate and efficiency of the hydration reaction.

10. The milk-of-lime preparation method using a waste heat recovery line, according to claim 9, wherein the waste heat recovering step comprises:

a step of transferring the water stored inside the water tank through a transfer pipe of which a first end is connected with a lower portion of the water tank to a second end of the transfer pipe;

a step of heat-exchanging the milk-of-lime stored inside the milk-of-lime tank with the water transferred through the transfer pipe, by means of a heat exchange pipe of which a first end is connected with the second end of the transfer pipe and of which a second end passes through the inside of the milk-of-lime tank; and a step of recovering the water that has undergone heat exchange into the inside of the water tank, by means of a recovery pipe of which a first end is connected with the second end of the heat exchange pipe and of which a second end is connected with an upper portion of the water tank.

11. The milk-of-lime preparation method using a waste heat recovery line, according to claim 10, wherein the waste heat recovering step further comprises:

a step of sensing a temperature of the milk-of-lime stored inside the milk-of-lime tank by means of a milk-of-lime temperature sensor;

a step of sensing a temperature of the water stored inside the water tank by means of a water temperature sensor; and a step of controlling recovery of waste heat, comprising: receiving a temperature value sensed from each of the milk-of-lime temperature sensor and the water temperature sensor; and then controlling an operation of the step of transferring the water.

12. The milk-of-lime preparation method using a waste heat recovery line, according to claim 11, wherein at the step of controlling recovery of waste heat, the operation of the step of transferring the water is controlled such that if the temperature value received from the milk-of-lime temperature sensor is 40° C. or above, the temperature value received from the water temperature sensor has a range of 40 to 50° C.

13. The milk-of-lime preparation method using a waste heat recovery line, according to claim 9, further comprising:

measuring of milk-of-lime comprising: measuring a supply amount of the calcine lime powder being supplied from the raw material input pipe and a supply amount of the water being supplied from the water input pipe through a meter installed in the milk-of-lime tank.

14. The milk-of-lime preparation method using a waste heat recovery line, according to claim 9, wherein at least one or more of the milk-of-lime tank, the water tank, the water input pipe, and the waste heat recovery line is thermally insulated.

15. The milk-of-lime preparation method using a waste heat recovery line, according to claim 9, wherein at least one or more of the milk-of-lime tank, the water tank, the water input pipe, and the waste heat recovery line is installed underground.

\* \* \* \* \*